United States Patent
Nichols

(10) Patent No.: US 8,259,775 B1
(45) Date of Patent: Sep. 4, 2012

(54) SYSTEM, APPARATUS AND METHOD FOR MANAGING MESSAGE COMMUNICATIONS IN SYSTEMS EMPLOYING FREQUENCY HOPPING

(75) Inventor: Steven Nichols, Maple Grove, MN (US)

(73) Assignee: Honeywell International, Inc., Morristown, NJ (US)

( * ) Notice: Subject to any disclaimer, the term of this patent is extended or adjusted under 35 U.S.C. 154(b) by 466 days.

(21) Appl. No.: 12/574,994

(22) Filed: Oct. 7, 2009

Related U.S. Application Data

(60) Provisional application No. 61/106,431, filed on Oct. 17, 2008.

(51) Int. Cl.
*H04B 1/00* (2006.01)

(52) U.S. Cl. ........ 375/133; 375/130; 375/132; 375/134; 375/135; 375/136; 375/137; 375/222; 375/219

(58) Field of Classification Search .................. 375/130, 375/132, 133, 134, 135, 136, 137, 222, 219
See application file for complete search history.

(56) References Cited

U.S. PATENT DOCUMENTS

| | | | |
|---|---|---|---|
| 4,677,617 A | 6/1987 | O'Connor | |
| 5,463,659 A | 10/1995 | Nealon | |
| 5,758,290 A | 5/1998 | Nealon | |
| 5,927,599 A | 7/1999 | Kath | |
| 6,028,885 A | 2/2000 | Minarik et al. | |
| 6,213,404 B1 | 4/2001 | Dushane et al. | |
| 6,700,920 B1 | 3/2004 | Partyka | |
| 6,778,902 B2 | 8/2004 | Hathiram et al. | |
| 6,859,450 B1 | 2/2005 | Mansfield | |
| 6,870,875 B1 | 3/2005 | Partyka | |
| 6,925,105 B1 | 8/2005 | Partyka | |
| 7,050,906 B2 | 5/2006 | Hathiram et al. | |
| 7,061,428 B1 * | 6/2006 | Amir et al. | 342/458 |
| 7,224,713 B2 | 5/2007 | Partyka | |
| 7,301,986 B2 | 11/2007 | Partyka | |
| 7,664,553 B2 * | 2/2010 | Roberts | 607/60 |
| 2004/0202229 A1 | 10/2004 | Raphaeli | |
| 2005/0047383 A1 | 3/2005 | Yoshida | |
| 2006/0227852 A1 | 10/2006 | Black | |
| 2007/0093975 A1 * | 4/2007 | Hoogenboom | 702/35 |
| 2007/0135179 A1 * | 6/2007 | Hardman et al. | 455/574 |
| 2007/0291822 A1 | 12/2007 | Staley et al. | |

OTHER PUBLICATIONS

U.S. Appl. No. 12/253,613, filed Oct. 17, 2008, Nichols et al.
U.S. Appl. No. 12/253,696, filed Oct. 17, 2008, Nichols.
U.S. Appl. No. 12/253,698, filed Oct. 17, 2008, Kidder et al.
U.S. Appl. No. 12/253,772, filed Oct. 17, 2008, Kidder et al.
U.S. Appl. No. 12/253,709, filed Oct. 17, 2008, Nichols.
U.S. Appl. No. 12/564,682, filed Sep. 22, 2009, Juntunen et al.

* cited by examiner

*Primary Examiner* — Siu Lee
(74) *Attorney, Agent, or Firm* — Hollingsworth Davis, LLC

(57) ABSTRACT

Systems, apparatuses and methods for managing message communications in systems employing frequency hopping. One method according to the invention involves transmitting a message via a frequency of a frequency hopping sequence, and determining when the same frequency will reoccur in the frequency hopping sequence. Relevant portions of the device enter a sleep mode, and the device emerges from the sleep mode when the frequency at which the message was transmitted reoccurs in the frequency hopping sequence. The device monitors for a response to the message via the frequency at which the message was transmitted when the frequency reoccurs in the frequency hopping sequence.

22 Claims, 7 Drawing Sheets

SYSTEM, APPARATUS AND METHOD FOR MANAGING MESSAGE COMMUNICATIONS IN SYSTEMS EMPLOYING FREQUENCY HOPPING

CROSS-REFERENCE TO RELATED APPLICATIONS

This application claims the benefit of Provisional Application No. 61/106,431, filed on Oct. 17, 2008, to which priority is claimed pursuant to 35 U.S.C. §119(e), and which is hereby incorporated herein by reference in its entirety.

FIELD OF THE INVENTION

This invention relates in general to communications, and more particularly to systems, apparatuses and methods for managing message transactions for devices employing frequency hopping.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. Systems today are continually moving towards wireless communication, which generally makes installation more convenient, and among other things provides greater flexibility and scalability.

A drawback to wireless communication is that information transfer is not confined to a wire, as in a direct wired system. Rather, the information is transmitted over the air, and transmissions from neighboring systems can interfere with system communications. To address this issue, wireless network systems have employed various methods of transmitting radio signals, such as frequency hopping. Frequency hopping generally refers to a modulation technique where the signal carrier is rapidly switched among many frequency channels. Each party to the communication must know the frequency hopping sequence in order to know when it is to transmit at a certain frequency in the sequence. Using the frequency hopping sequence, transmitting devices can properly address targeted devices, and receiving devices can reject information from neighboring devices that are not within their system but within their reception range.

When using frequency hopping, two or more communicating devices will typically communicate properly when the transmitting and receiving devices are operating at the same communication frequency at the same time. By synchronizing the timing of their frequency hopping sequence, two or more devices can determine the time and duration of the window or "time slot" in which communications can be effected at a given one of the frequencies. This is manageable where both the sending and receiving devices know that data may be communicated during any of these time slots. There are, however, situations where a device may anticipate an incoming message, but it is unknown when that message may arrive. In frequency hopping systems where numerous frequencies are used, the device anticipating receipt of the message could simply synchronously monitor every frequency in the hope that the anticipated message will arrive at some time on one of the frequencies. This, however, requires significant local resources at the receiving device to continuously monitor for the anticipated incoming message(s).

For example, limiting device power consumption may be an important consideration in a system, particularly where one or more of the devices are battery powered. Engaging in continuous monitoring for certain anticipated incoming messages with little or no knowledge of their expected arrival time may result wasted energy resources, thereby unnecessarily depleting the life of the device's battery. Solutions to such a problem are further complicated where frequency hopping is employed, as current devices anticipating an asynchronous incoming message have little recourse but to sequentially monitor each of the communication frequencies of the frequency hopping sequence until the anticipated message arrives. The problem is further exacerbated if an initial message that prompts a response is corrupted, if the response is corrupted, if message/response acknowledgements are not properly communicated, etc. In such cases, a device anticipating a response message may potentially have to leave its receiving circuitry turned on for a longer time, or even an infinitely long time. These and other situations further deplete local resources, such as the longevity of the device's battery.

Accordingly, there is a need in the communications industry for an improved manner of managing message transactions for devices employing frequency hopping. The present invention fulfills these and other needs, and offers other advantages over the prior art.

SUMMARY

To overcome limitations in the prior art described above, and to overcome other limitations that will become apparent upon reading and understanding the present specification, the present invention discloses systems, apparatuses and methods for facilitating communication between devices, such as by facilitating message timing for devices communicating using frequency hopping techniques.

In accordance with one embodiment of the invention, a method is provided that includes transmitting a message via a frequency of a frequency hopping sequence, and determining when the same frequency will reoccur in the frequency hopping sequence. The method involves entering a sleep mode, and emerging from the sleep mode when the frequency at which the message was transmitted reoccurs in the frequency hopping sequence. The method further involves monitoring for a response to the message via the frequency at which the message was transmitted when the frequency reoccurs in the frequency hopping sequence.

According to another embodiment, the above method may further involve recognizing that the response was not received during the monitored frequency's time slot duration, determining when the same frequency will again reoccur in the frequency hopping sequence, reentering the sleep mode, emerging from the sleep mode when the frequency at which the original message was transmitted reoccurs in the frequency hopping sequence, and monitoring for the response to the message via the frequency. According to more particular embodiments, the functions of recognizing that the response was not received, determining when the same frequency will again reoccur, reentering and emerging from the sleep mode, and monitoring for the response are repeated until the response is received, or in another embodiment for a predetermined number of times.

According to another embodiment, the above method may further involve recognizing that the response was not received during the monitored frequency's time slot duration, determining when the same frequency will again reoccur in the frequency hopping sequence, reentering the sleep mode, emerging from the sleep mode when the frequency at which the original message was transmitted reoccurs in the frequency hopping sequence, and monitoring for the response via the frequency immediately following the frequency in the frequency hopping sequence at which the original message was transmitted, at the time the frequency of the original message transmission reoccurs in the frequency hopping sequence.

According to another embodiment of such a method, transmitting the message involves transmitting the message by way of a frequency of a local frequency hopping sequence when the frequency arises in a shared frequency hopping sequence. It is determined when the same frequency will reoccur by determining when that frequency will reoccur in the shared frequency hopping sequence. In this embodiment, emerging from the sleep mode occurs when the frequency at which the message was transmitted reoccurs in the shared frequency hopping sequence, and monitoring for a response involves monitoring for the response via the frequency at which the message was transmitted when the frequency reoccurs in the shared frequency hopping sequence. In a more particular embodiment, this embodiment further involves recognizing that the response was not received during the monitored frequency's time slot duration, determining when the next successive frequency in the local frequency hopping sequence will occur in the shared frequency hopping sequence, reentering the sleep mode, emerging from the sleep mode when said next successive frequency reoccurs in the frequency hopping sequence, and monitoring for the response to the message via said next successive frequency.

According to another embodiment, the method further involves monitoring for an acknowledgement from a target device indicative of receipt of the message by the target device, where the monitoring involves monitoring for the acknowledgement at the same frequency of the message transmission following transmission of the message. In a more particular embodiment, monitoring for the acknowledgement at the same frequency involves turning on a receiver to monitor the frequency in response to transmitting the message at that frequency. In yet another embodiment, monitoring for the acknowledgement further involves determining that the acknowledgement was not received, and retransmitting the message via a successive frequency of the frequency hopping sequence.

According to yet another embodiment, entering the sleep mode involves reducing power consumption in a device that transmitted the message by deactivating one or more functional components in the device. For example, deactivating a functional component(s) may involve at least deactivating a receiver in the device to postpone monitoring for the response until the device emerges from the sleep mode. In such a case, emerging from the sleep mode may involve at least activating the receiver in the device to monitor for the response.

According to another embodiment, determining when the same frequency will reoccur in the frequency hopping sequence involves calculating a time duration, based on at least a quantity of frequencies in the frequency hopping sequence, an order of the frequencies in the frequency hopping sequence, and a time slot duration in which each of the frequencies is active, until the same frequency arises.

In accordance with another embodiment of the invention, an apparatus is provided that includes at least a receiver, a transmitter, a timer module and a sleep control module. In one embodiment the transmitter is configured to transmit a message via a frequency, and the timer module is configured to determine when the frequency will occur in a frequency hopping sequence. The sleep control module is configured to cause at least the receiver to enter a sleep mode, and to cause the receiver to emerge from the sleep mode when the timer module indicates that the frequency has occurred in the frequency hopping sequence. The receiver is configured to monitor for a response to the message via the frequency at which the message was transmitted when the receiver has emerged from the sleep mode.

The timer module in one embodiment is further configured to determine a duration for which the frequency will be active in the frequency hopping sequence. If no response to the message was received during the duration, the timer module notifies the sleep control module to cause at least the receiver to reenter the sleep mode until the timer module again indicates that the frequency has reoccurred in the frequency hopping sequence.

In another embodiment, the timer module is further configured to monitor for the response to the message via a frequency subsequent to the frequency in the frequency hopping sequence at which the message was transmitted, at the time the frequency at which the message was transmitted occurs in the frequency hopping sequence.

In another embodiment of the apparatus, an acknowledge module is provided that is configured to recognize acknowledgement signals received from a target device via the receiver in response to successful transmission of the message to the target device. In another embodiment, a retry module is coupled to the acknowledge module to receive an indication of non-receipt of the acknowledgement signals, and to effect a retransmission of the message via the frequency used to originally send the message. In another embodiment, a retry module is coupled to the acknowledge module to receive an indication of non-receipt of the acknowledgement signals, and to effect a retransmission of the message via a second frequency following the frequency in a transmitter frequency hopping sequence.

According to another embodiment, an acknowledge module may be configured to formulate an acknowledgement message for transmission to a target device that provided the response to the message.

In accordance with another embodiment of the invention, a system is provided that includes at least one target device and at least one initiating device. The target device(s) may include a receive timing module configured to identify an active frequency in a shared frequency hopping sequence in which to monitor for incoming messages. The at least one initiating device includes a receiver, a transmitter, a timer module and a sleep control module. The transmitter is configured to transmit a response-evoking message to the at least one target device via a frequency. The timer module is configured to determine when the frequency will occur in the shared frequency hopping sequence. The sleep control module is configured to cause at least the receiver to enter a sleep mode, and to cause the receiver to emerge from the sleep mode when the timer module indicates that the frequency has occurred in the shared frequency hopping sequence. The receiver is configured to monitor for a response to the response-evoking message from the at least one target device via the frequency when the receiver has emerged from the sleep mode.

In a more particular embodiment, the at least one target device further includes a response creation module configured to formulate the response in response to receiving the response-evoking message from the at least one initiating device.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention relates to facilitating communication between multiple devices. While the invention can be implemented in wireless or wired environments, the description herein is directed to wireless embodiments. Among other things the invention facilitates message timing for devices communicating using frequency hopping techniques. As indicated above, there are situations where a device may anticipate an incoming message, but it is unknown when that message may arrive. For example, an initiating device may send a message to a target device, where the message is of a type that a response will eventually be provided back to the initiating device from the target device. If the target device requires significant time in order to process the received information and to formulate the response message, the initiating device that is anticipating the eventual response typically waits with its receiver on, wasting energy. This is particularly troublesome where the initiating device is battery powered, as the energy waste unnecessarily depletes battery life. The more time the target device takes to provide the response, more energy is wasted at the initiating device. Further, if the initial message was corrupted, a battery powered initiating device leaves its receiver on to receive a response that will never arrive. The more time the initiating device allows for the target device to process and send back its response, the longer the wasted receiver time before the initiating device can retry its message.

These and other problems are addressed by the present invention. For example, one embodiment of the invention involves transmitting a message(s) via a frequency of a frequency hopping sequence. It is determined when the same frequency will reoccur in the frequency hopping sequence. One or more portions of the transmitting device enters a sleep mode, which awaken from the sleep mode when the frequency at which the message was transmitted reoccurs in the frequency hopping sequence. A response to the message is monitored via the frequency at which the message was transmitted when the frequency reoccurs in the frequency hopping sequence. This is one embodiment of the invention, and numerous other embodiments are described below to facilitate an understanding of the invention.

Figure 1:
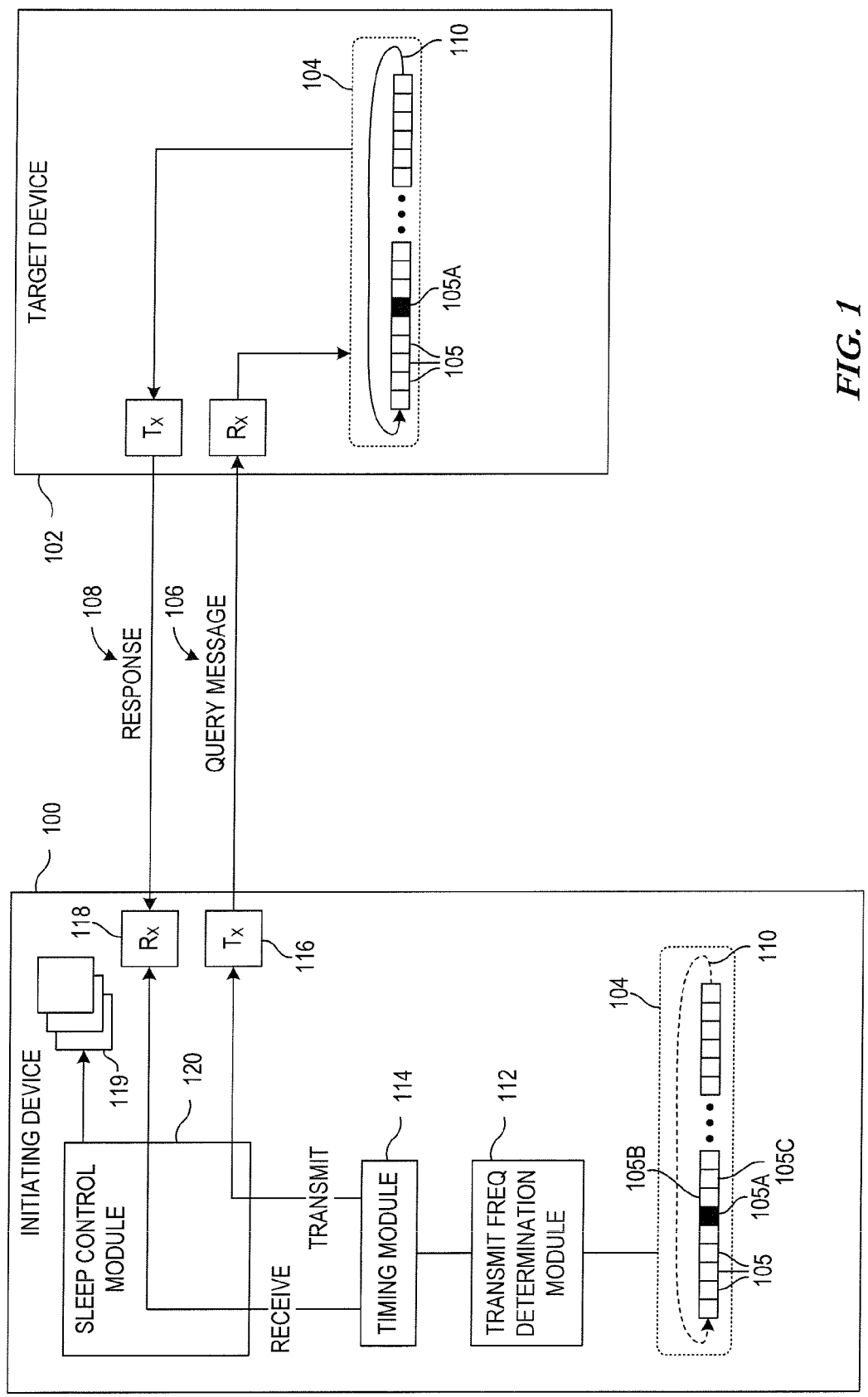
FIG. 1 generally illustrates a representative embodiment for coordinating message response timing in a system of devices that communicate using frequency hopping.

FIG. 1 generally illustrates one embodiment for coordinating message response timing in a system of devices that communicate using frequency hopping. The embodiment of FIG. 1 illustrates how a querying device initiates a message that requires or otherwise results in a response(s), and "sleeps" or otherwise removes itself from active engagement with the responding device until the querying device determines that it is time to ready itself for the possibility of receiving a response.

The initiating device 100 represents any device that may communicate with one or more other devices 102 using frequency hopping. The embodiment of FIG. 1 involves wirelessly communicating information between devices 100, 102 using radio frequency (RF) transmissions, where the transmission of messages and responses can be sent at any of a plurality of available transmission frequencies. Frequency hopping is used to the extent that transmissions of information and receptions of communicated information take place according to sequences of communication frequencies. In a frequency hopping system, the communication frequencies do not remain constant, but rather are changed over time and/or in connection with triggering events in order to continually change the frequency in which information is communicated.

In one embodiment, the target device(s) 102 operates using a frequency hopping sequence for receiving messages that is different than the frequency hopping sequence used by the transmitting device(s) 100 when transmitting messages. For example, the transmitting device 100 may transmit information at the next available frequency of its frequency hopping sequence, but does not transmit that information until that same frequency arises in the target device's 102 frequency hopping sequence which is known to the transmitting device. In such an embodiment the transmitter sequence determines which frequency to use in transmitting the information, and the receiver sequence determines when that transmission will occur. In other embodiments a single frequency hopping sequence may be shared for purposes of transmission and reception. The embodiment of FIG. 1 applies in either case, as long as at least one frequency hopping sequence 104 is shared and substantially synchronized between the devices 100, 102.

The initiating device 100 represents the device in the system that at a given time sends a message 106 to a targeted device 102, and requests or anticipates a response 108 to the message 106. In a frequency hopping system, response timing and coordination is not a trivial consideration. Responses to messages may not be formulated at the target device 102 at any specific time, but rather response formulation can complete at any time relative to the currently active frequency in the frequency hopping sequence. Thus, the initiating device 100 may not be able to expect to receive a response at some certain time. If the initiating device 100 listened for a response(s) at every frequency of the frequency hopping sequence hopping sequence, the device 100 would need to continually attempt to receive and process information. Such continual monitoring requires, among other things, significant processing resources and involves significant power consumption. This is particularly troublesome where the device 100 is battery powered, as valuable limited power resources may be unnecessarily wasted.

The initiating device 100 and target device 102 share a frequency hopping sequence 104. For example, each device 100, 102 may synchronously step through each of the frequencies 105 of the frequency hopping sequence 104 to know which frequency 105A is active for communications at a given time. Any manner of synchronizing such a shared frequency hopping sequence(s) 104 may be used in connection with the invention, including as described in co-pending U.S. patent application Ser. No. 12/564,682, filed on Sep. 22, 2009, and entitled "System, Apparatus and Method For Synchronizing Communications Between Devices," the content of which is incorporated herein by reference in its entirety. In normal operation the frequencies 105 of the frequency hopping sequence 104 may be considered in a continuous loop as depicted by return arrow 110.

In one embodiment, the active frequency in which a message is to be transmitted is determined by the transmit frequency determination module 112. For example, the transmit frequency determination module 112 may store or otherwise access the frequency hopping sequence 104, and may also store the last transmission frequency that was used to send a message. By knowing the sequence 104 and the last used transmission frequency, the transmit frequency determination module 112 can readily identify the next transmission frequency 105A to use in the frequency hopping sequence 104. In other embodiments, the frequency that is currently active, or active at some future time (e.g. the frequency after the currently active frequency), may be used to transmit the message. Any manner of determining a frequency in which to transmit the message may be used.

Not only may the frequency hopping sequence 104 be used to determine at which frequency messages will be transmitted, in one embodiment it is also used to monitor for incoming messages. A device 100, 102 that may receive a message knows which frequency to monitor, and at what time and/or for what duration. The timing module 114 may be used to determine when each of the frequencies in the frequency hopping sequence 104 is to become the active frequency in which to monitor for incoming signals (e.g. response 108 signals). In one embodiment, the timing module 114 determines when the same frequency 105A at which the message 106 was transmitted will reoccur in the frequency hopping sequence 104. In a more particular embodiment, the timing module 114 calculates a time duration based on at least the number of frequencies in the frequency hopping sequence 104, the order (sequence) of the frequencies 105, and a time slot duration in which each of the frequencies 105 is active, until the same frequency 105A used to transmit the message 106 arises again in the sequence 104. As described more fully below, the timing module 114 can notify the sleep control module 120 to cause one or more functional components 116, 118, 119 to enter a sleep mode during the calculated time interim between occurrences of the relevant frequency 105A. In one embodiment the timing module 114 further includes a timer function to count out the calculated time duration to know when the frequency 105A will again become active in the sequence 104. For example, if the timing module 114 calculates a time duration of 250 ms between occurrences of the message 106 transmission frequency 105A, the timer can count down from 250 ms to 0 ms, at which time it is known that the frequency 105A has again occurred in the frequency hopping sequence 104.

In other embodiments where multiple frequency hopping sequences are used (described in greater detail below), the timing module 114 may additionally assist in determining when a message 106 will be transmitted from the device 100. For example, the transmitting device 100 may transmit information at the next available frequency of its own local frequency hopping sequence (not shown), but does not transmit that information until that same frequency arises in the target device's 102 frequency hopping sequence 104 that is known to the initiating device 102.

The device 100 initiates a query directed to the target device 102 via the transmitter $T_X$ 116. The query is provided by way of a message 106. A "query" in this sense generally refers to any response-evoking message; i.e. a message that requests a response, or will otherwise elicit or result in a response. In accordance with one embodiment of the invention, the initiating device 100 enters a sleep mode after transmitting its message 106. This may occur immediately following message 106 transmission, or after some other event(s) such as receiving a message acknowledgement. Sleep mode involves reducing and/or suspending one or more functional operations and/or device components to conserve local resources such as processing power, battery power, etc. For example, to conserve power, the device 100 may enter a sleep mode after sending a message 106 and receiving a message acknowledgement (not shown) from the target device 102, where at least the receiver $R_X$ 118 is temporarily turned off to conserve battery power. In the illustrated embodiment, the sleep control module 120 controls functional units and/or other components of the device 100 in order to at least conserve power consumption.

It may be desirable to enter such a sleep mode after transmitting the query message 106 because a response 108 from the target device 102 will most likely not be immediately provided. The target device 102 receives and processes the query message 106, formulates a response, and determines when to send the response based on the frequency hopping sequence 104. During this time, the initiating device 100 can temporarily enter the sleep mode to conserve local resources. More particularly, the timing module 114 may calculate the time duration until the next occurrence of the frequency 105A at which the message 106 was transmitted as described above. The timing module 114 notifies the sleep control module 120 to cause one or more functional components 116, 118, 119 to enter the sleep mode during the calculated time interim between occurrences of the frequency 105A.

In embodiments of the invention, the initiating device 100 awakens the temporarily dormant components in order to ascertain whether a response 108 to the query message 106 is being provided. For example, the timing module 114 may include a timer to count out the calculated time duration to know when the frequency 105A will again become active in the sequence 104. When this occurs, the timing module 114 can notify the sleep control module 120 that it is time to monitor for a response 108 at the same frequency 105A in which the message 106 was transmitted, and therefore components such as the receiver 118 are to be awakened to listen for the response 108. According to embodiments of the invention, the sleep pattern and other response timing is coordinated in view of the one or more frequency hopping sequences involved in the message transaction. This is described in greater detail below.

If the response 108 is received when the receiver 118 has been awakened to listen for the response, the device 100 may optionally send an acknowledgement signal (not shown), and the transaction is complete. On the other hand, the target device 102 may not be able to formulate the response 108 by the time the frequency 105A again occurs in the sequence 104. In this case, the receiver 118 will not receive the response 108 during the time that it is monitoring for it. The receiver 118 may then reenter the sleep mode until the next occurrence of the frequency 105A, at which time the receiver 118 will be enabled to again monitor for a response. More particularly, one embodiment involves configuring the timer module 114 to determine a time duration for which the frequency 105A will be active in the frequency hopping sequence 104. For example, this time duration may correspond to the duration of the time slot at which the frequency 105A is active. If no response 108 to the message 106 was received during this time duration, the timing module 114 can notify the sleep control module 120 to cause at least the receiver 118 to reenter the sleep mode until the timer module 114 again indicates that the frequency 105A has reoccurred in the frequency hopping sequence 104.

As noted above, one embodiment involves reentering the sleep mode until the timer module 114 again indicates that the frequency 105A has reoccurred in the frequency hopping sequence 104. In another embodiment, the sleep mode is reentered until the timer module 114 indicates when the frequency 105A will next occur, but actually monitors on the next frequency of the frequency hopping sequence (i.e. the frequency following frequency hopping sequence 105A in the frequency hopping sequence). In other words, in such an embodiment, if the response by the target device was not immediately ready such that the initiating device 100 would enter the sleep mode, the device 100 would awake to monitor for the response at the same time in the frequency hopping sequence (i.e. at the time frequency 105A reoccurred in the sequence), but would monitor on frequency 105B which is the next frequency in the frequency hopping sequence. In this embodiment, each time the response was not received and the device 100 entered sleep mode and subsequently awakened to monitor for the response, it would monitor at the time of the original frequency 105A, but each time on the next frequency of the frequency hopping sequence (i.e. 105B, 105C, etc.). Other representative examples of manners for handling situations where a response 108 is not provided at the first occurrence of the frequency 105A are described, for example, in connection with FIGS. 3 and 4.

It should be recognized that the transmit frequency determination module 112, transmit timing module 114 and sleep control module 120 may be implemented in any one or more of hardware, firmware, software, discrete circuits, etc. For example, in one embodiment, a processor is programmed to perform the tracking, storing, comparing and/or other functions used by the modules 112, 114, 120. Alternatively, hardware compare functions and other functions may be implemented for any or all of the functions performed by these modules 112, 114, 120. Accordingly, hardware, firmware, software or any combination thereof may be used to perform the various functions and operations described herein.

Figure 2:
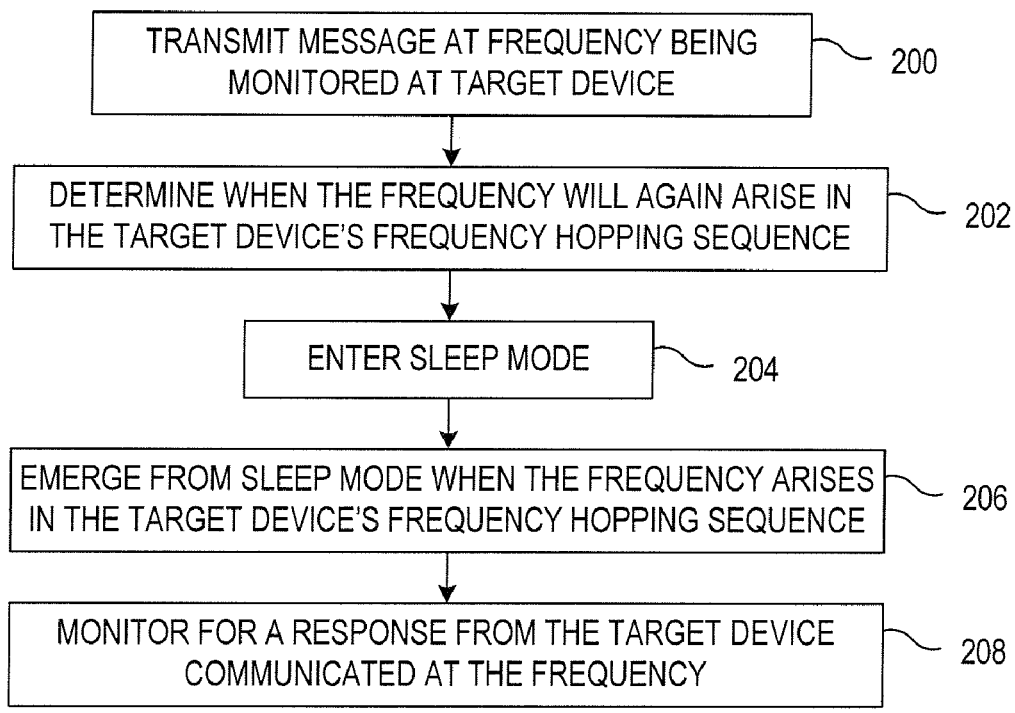
FIG. 2 is a flow diagram illustrating one embodiment of a method for scheduling message communications in accordance with the present invention.

FIG. 2 is a flow diagram illustrating one embodiment of a method for scheduling message communications in accordance with the present invention. A message is transmitted 200 at the frequency that is being monitored at the target device to which the message is directed. The transmitting device is privy to the target device's frequency hopping sequence. If this shared frequency hopping sequence is properly synchronized between the communicating devices, the transmitting device will know when the target device is monitoring each different frequency of the sequence. For example, if the transmitting device knows that the target device has just started listening for messages at frequency F (of a plurality of different frequencies in frequency hopping sequence), then the transmitting device can transmit its message at frequency F during the time slot duration at which the frequency F is being monitored at the target device.

The transmitting device determines 202 when the frequency F will arise again in the frequency hopping sequence. For example, the transmitting device may track the progression of active frequencies in the frequency hopping sequence to determine when the frequency F will become active again. In another example, the transmitting device can calculate the time until the frequency F will again become active, based on data such as the order of the frequencies in the sequence, the number of frequencies in the frequency hopping sequence, the duration of each active frequency (i.e., the "time slot" duration), etc. In one embodiment, the transmitting device performs such a calculation so that the device can enter the sleep mode 204 while waiting for the frequency F to again become active.

Regardless of the manner in which the determination 202 is made, the device enters a sleep mode as shown at block 204. As described above, this may at least include turning off the transmitting device's receiver/transceiver to reduce power consumption until the receiver is needed again. This occurs when the same frequency arises in the target device's frequency hopping sequence, at which time the device exits the sleep mode as depicted at block 206. Thus, the device's receiver is reactivated approximately when the same frequency arises in the frequency hopping sequence, and the device can begin monitoring 208 for a response communicated at that frequency from the target device. In one embodiment, a time duration is calculated to determine 202 when the frequency will arise again, and expiration of a timer that counts out the calculated time duration is used to know when to emerge 206 from the sleep mode to monitor 208 for the response.

It should be noted that for the flow diagram of FIG. 2, as well as other flow diagrams included herein, the order in which functional features may be executed does not necessarily correlate to the depicted order in the representative flow diagram. The flow diagram provides an example of a method in accordance with the invention, and is provided to facilitate an understanding of functional aspects of the invention. The flowcharts are not intended to be limiting as to an actual order of functional execution. For example, in FIG. 2 the determination 202 of when the frequency will again arise in the target device's frequency hopping sequence may be performed before the message is transmitted 200, after the message is transmitted 200, before or after sleep mode has been entered 204, etc.

In one embodiment, the initiating device does not require entering a sleep mode in the sense that functions are suspended and/or components are temporarily turned off. For example, using the example of FIG. 2, the device may transmit 200 a message at a frequency that is monitored at the target device and determine 202 when that frequency will again arise in the target device's frequency hopping sequence as described above. In one embodiment, the initiating device may not turn off one or more components, functions, etc., but rather may simply opt to perform other functions or do nothing until the frequency again arises in the target device's frequency hopping sequence. At that time, the initiating device can monitor 208 for a response from the target device communicated at the same frequency, while never having turned off the receiver. Thus, in some embodiments, entering 204 the sleep mode may simply refer to not actively monitoring for the response from the target device during the time that frequencies other than the transmitted 200 frequency are active in the frequency hopping sequence.

Figure 3:
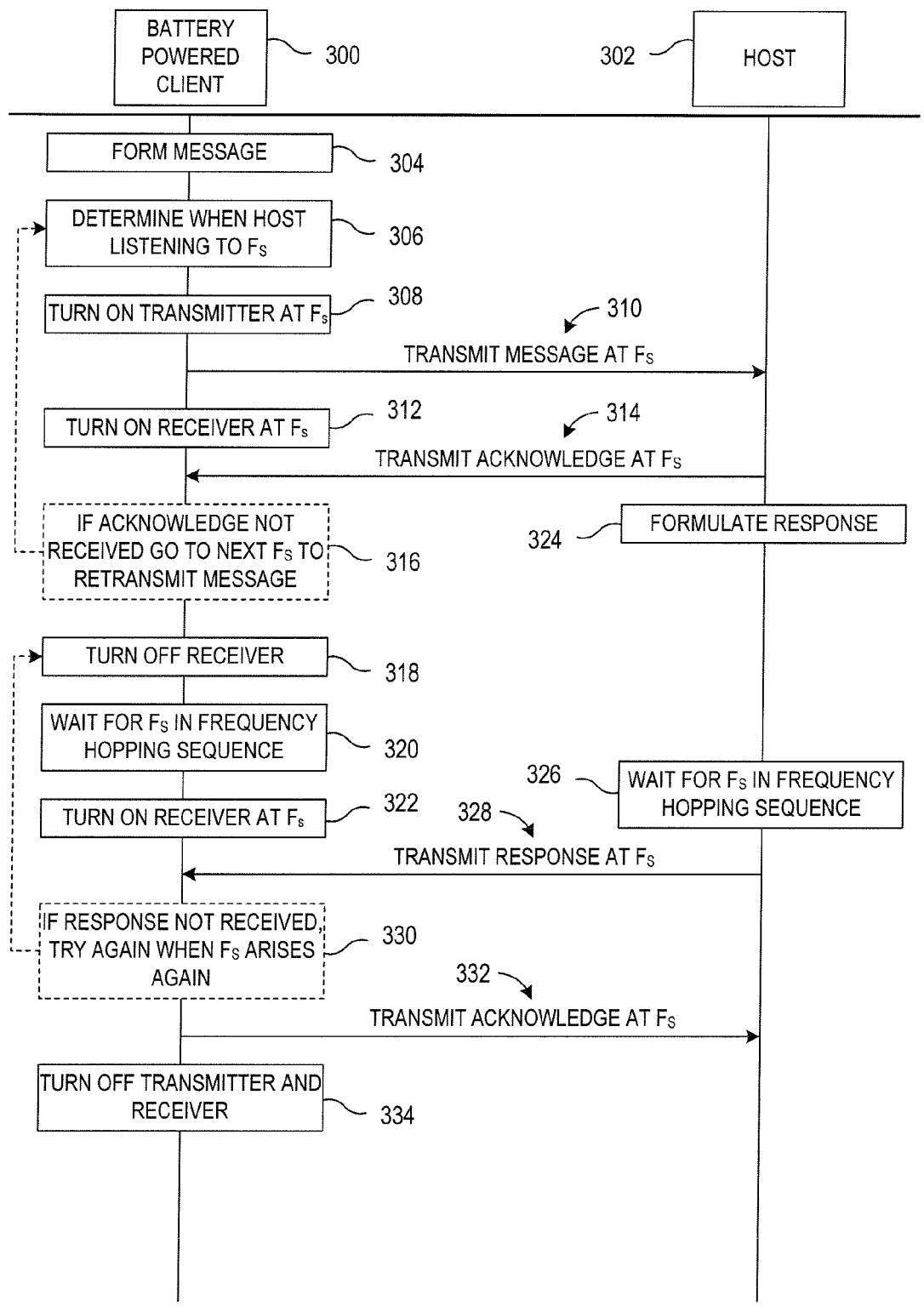
FIG. 3 is a message flow diagram illustrating an embodiment of the invention that optionally manages message acknowledgments, message retries, and response delays.

The invention is particularly beneficial where the initiating device enters a sleep mode where power consumption is reduced. For example, the initiating device may be a battery powered device where power conservation is important to extend the operational life of the battery. FIG. 3 is a message flow diagram illustrating an embodiment of the invention where at least the initiating device is a battery powered device. The embodiment of FIG. 3 is equally applicable to embodiments where the initiating device is not battery powered, but rather is powered by an AC or other continuous power source. Further, while the embodiment of FIG. 3 assumes that the target device is powered by a continuous power source, this need not be the case as the target device may also be battery powered. The initiating device is represented by the battery powered client 300 and the target device is represented by the host 302. This example further describes representative manners of acknowledging the receipt of messages and responses, as well as describes representative manners of handing non-receipt of acknowledgement messages and/or responses.

The client 300 forms a message to send as shown at block 304. As an example, the client 300 may form a message that includes a query to request return information, such as a temperature setpoint, from the host 302. The formulation of the message may involve creating the message, or selecting a previously prepared message. The client 300 determines 306 when the host 302 is monitoring or "listening" to a selected frequency labeled $F_S$. This determination 306 may be accomplished as a result of the client 300 being privy to the frequency hopping sequence that the host 302 is using to monitor for incoming message transmissions. While the transmitter/transceiver at the client 300 may already be turned on or otherwise active, one embodiment involves turning on 308 the transmitter at the selected frequency $F_S$ when it is to send its formulated message.

The client 300 transmits 310 the message at the selected frequency $F_S$, and in one embodiment turns on 312 its receiver at the same frequency $F_S$. As the message was transmitted by the client 300 at the frequency $F_S$ at the time $F_S$ was being monitored by the host's 302 receiver, the host will normally be able to receive the message. If the host 302 indeed receives the transmitted message 310, one embodiment involves the host 302 transmitting 314 an acknowledgement signal back to the client 300 at the same frequency $F_S$. This notifies the client 300 that the host 302 actually received the message, and will act on it. If such an acknowledgement 314 is not received by the client 300 that expects to receive an acknowledgement signal, the client may retry the message. In other words, the client 300 may attempt to retransmit the same message to the host 302 as a result of the host 302 having failed to indicate that it received the prior message transmission. This could be done at the same frequency or any other desired frequency, however in one embodiment the next frequency $F_S$ in the frequency hopping sequence is selected to retransmit the message as shown at block 316. This next frequency can be the next frequency in the shared frequency hopping sequence that is also used by the host 302 to monitor for incoming transmissions, or may be another frequency hopping sequence such as a local frequency hopping sequence used by the client 300. In either case, if the acknowledgement signal is not received, it is again determined 306 when the host 302 is listening to the selected frequency $F_S$ (whether the same frequency or a new frequency), and the process continues by retransmitting the message 310 at $F_S$ and again monitoring for the acknowledgement signal 314.

In embodiments involving an acknowledgement signal, the client 300 can turn off 318 its receiver or otherwise enter some designed sleep mode after receiving the acknowledgement signal. The client 300 waits 320 for the $F_S$ used to transmit and acknowledge the message to again arise in the host's 302 frequency hopping sequence. Where the receiver is turned off during this waiting period, power consumption of the client 300 is reduced. When $F_S$ again becomes active in the host's frequency hopping sequence, the receiver is turned back on 322 at that same frequency $F_S$ in order to monitor for a response to the message from the host 302.

Meanwhile, upon receiving (and in some embodiments acknowledging) the message 310, the host 302 formulates 324 a response to the received message. For example, if the received message 310 included a query requesting a temperature setpoint in a heating, ventilation and air conditioning (HVAC) implementation, a response can be formulated that includes the requested temperature setpoint. The host 302 waits 326 for the $F_S$ in which it received the message 310 to arise again in its frequency hopping sequence, at which time it transmits 328 its formulated response back to the requesting client 300.

The time at which the host 302 has completed formulation of the response can vary. For example, the host 302 may be processing other requests and/or performing other functions that may delay completion of the response. As another example, the host 302 may need to perform various functions and/or wait to obtain data needed to complete the response. These and/or other reasons can make the time at which a response can be formulated quite unpredictable. As a result, the response may not be ready to be transmitted from the host 302 to the client 300 when the selected frequency $F_S$ arises again in the frequency hopping sequence. The client 300 is listening for the response when $F_S$ arises again in the shared frequency hopping sequence. However, the client 300 may not receive the response 328 due to response formulation delays at the host as described above. In this case, the client 300 may again monitor for receipt of the response 328 at the next occurrence of $F_S$ in the shared frequency hopping sequence, as depicted by block 330 and the return path to block 318. As can be seen from the diagram, the client 300 can turn off its receiver 318 and/or enter some other designed sleep mode during each waiting period 320 that may occur as a result of the host's 302 delay in transmitting the response 328. These attempts to receive a response may continue indefinitely. Alternatively, the client 300 may attempt to receive a response from the host for some time period, for some number of attempts (e.g. ten attempts), or until some other predefined conceding event occurs.

Block 330 indicates that if the response is not received, the client may try again when $F_S$ arises again in the sequence. In one embodiment, the same frequency $F_S$ is monitored at the time that $F_S$ reoccurs in the frequency hopping sequence. On subsequent monitoring for the response 328, the client monitors at $F_S$ at the time that $F_S$ arises in the frequency hopping sequence. In another embodiment also described in connection with FIG. 1, the next frequency in the sequence (e.g., $F_{S+1}$) is monitored, but at the time of the original frequency $F_S$ in the frequency hopping sequence. In such an embodiment, if the client reenters sleep mode again due to the response 328 still being unavailable, the client can continue to move to the next frequency in the frequency hopping sequence, but monitor that next frequency ($F_{S+x}$) at the time that the original frequency ($F_S$) arises in the frequency hopping sequence.

In one embodiment, when the client 300 ultimately receives the response 328, it may transmit 332 an acknowledgement to the host 302 indicating that the response 328 was received. To further conserve power and/or other local resources, the client 300 may then enter a sleep mode such as by turning off 334 its transmitter and receiver until a new message is to be transmitted or some other activity is to occur (e.g. synchronization of the frequency hopping sequence between the host/client).

Another example of the utilization of a frequency hopping scheme to synchronize response message reception, which includes a battery powered client and a non-battery powered host, is now summarily described. At particular time intervals, the non-battery powered device (e.g. host 302) may change the frequency that its receiver is listening to. In one embodiment, the number of unique frequencies and their sequence is constant and repeats itself. The time slot interval for each frequency may be any desired interval, but in one embodiment is chosen to be the shortest time that the receiver can reliably detect and lock onto a message at that frequency. A battery powered device (e.g. client 300) has knowledge of the frequency hopping sequence and synchronizes its timing to that of the non-battery powered device so that it knows the time that the non-battery powered device begins monitoring a given frequency. When the battery powered device initiates an exchange, it begins its transmission at the same time and frequency that the non-battery powered device begins receiving. When the battery powered device has finished its transmission, it may turn on its receiver using the same frequency that the message was transmitted, while the non-battery powered device sends back a short acknowledgement message. The battery powered device may then turn off its receiver while it resumes frequency hopping its receiver. Because the acknowledgment may be short and require very little processing time to return, the battery powered device need only keep its receiver on for a short time. If the battery powered device did not receive an acknowledgement, it can retry its message on some other frequency shortly after. If it did receive an acknowledgement, the battery powered device waits until that same frequency appears again in the sequence, and turns on its receiver using that frequency. The non-battery powered device forms a response, and begins transmitting instead of receiving at that frequency when the frequency next occurs in the sequence. If the battery powered device receives the response, it may immediately send back an acknowledgement to the non-battery powered device on the same frequency, leave its transmitter and receiver off, and thereby complete the transaction. On the other hand, if the battery powered device hears no response, it may turn off its receiver and wait again for the frequency to reappear in the sequence. This may continue indefinitely, for some time duration, for some number of attempts, etc., before giving up. The period of time for the same frequency to occur in the sequence may be sufficient for the non-battery powered device to process the received message and form a response. If not, there are multiple opportunities for the non-battery powered device to get the response back to the battery powered device. The non-battery powered device may continue to send back its response message each time the frequency appears in the sequence until it receives an acknowledgement.

Figure 4:
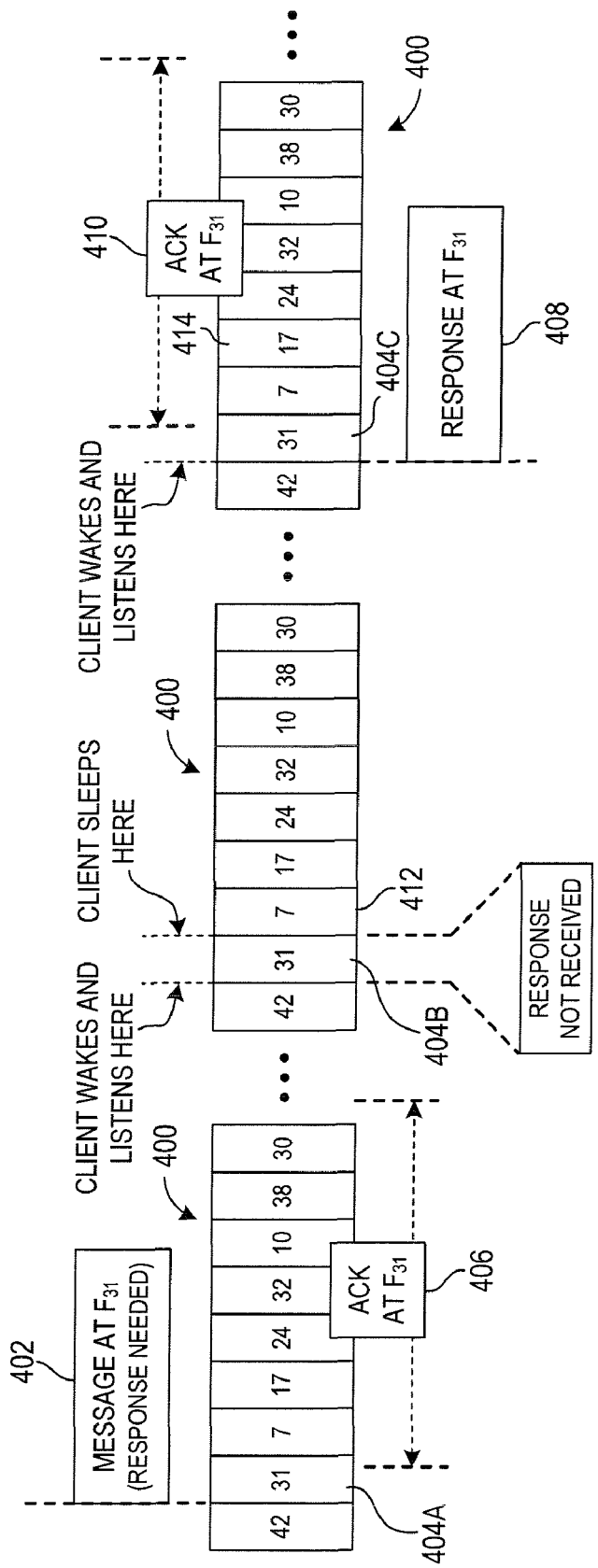
FIG. 4 is a diagram illustrating the use of a shared frequency hopping sequence in accordance with one embodiment of the invention.

FIG. 4 is a diagram illustrating the use of a shared frequency hopping sequence in accordance with one embodiment of the invention. The shared frequency hopping sequence 400 represents the frequency hopping sequence that is used by the target device when monitoring for incoming message transmissions. The same frequency hopping sequence 400 is known to the message-initiating device, and in one embodiment is synchronized with that frequency hopping sequence at the target device. For example, the frequency hopping sequence may include fifty frequencies $F_0$-$F_{49}$. Using any desired algorithm, the frequencies may be arranged in an order that results in the frequency hopping sequence. In the illustrated embodiment, the frequencies are arranged in the sequence: $F_{42}$, $F_{31}$, $F_7$, $F_{17}$, $F_{24}$, $F_{32}$, $F_{10}$, $F_{38}$, $F_{30}$, etc. The target device (hereinafter "host") monitors for incoming signals/messages at $F_{42}$ for a period of time referred to herein as a time slot. Upon expiration of the period of time, the target device monitors for incoming signals at $F_{31}$, and then at $F_7$, etc. The message-initiating device (hereinafter "client") knows the same sequence, and periodically or occasionally is synchronized with the host's frequency hopping sequence so that both the client and host are aware of when, and for how long, each of the frequencies is actively monitored at the host.

As shown in FIG. 4, the client sends a message 402 to the host at frequency $F_{31}$ 404A. The client knows that the host should be monitoring for signals at that frequency at the time that the message is transmitted by the client at that frequency. In the illustrated example, the message 402 is a message that indicates that a response to the message is solicited from the host. The client's receiver then monitors for an acknowledgement signal (ACK) for some time after sending the message 402, and receives the ACK 406. In one embodiment, the client turns off its receiver to conserve power, and waits until the same $F_{31}$ 404B frequency reoccurs in the frequency hopping sequence 400. At that time, the client awakes and again monitors for the response at frequency $F_{31}$ 404B. The client listens at that frequency $F_{31}$ 404B for the time slot duration. In the illustrated embodiment, no response from the host was received during the $F_{31}$ 404B time slot, and therefore the client again enters the sleep mode. The client again waits until the same $F_{31}$ 404C frequency reoccurs in the frequency hopping sequence 400, at which time it awakes and again monitors for the response at frequency $F_{31}$ 404C. If the host has the response ready for transmission, the host transmits the response 408 at $F_{31}$ 404C, which is received by the client. The client can send an ACK 410 back to the responding host to notify the host that the client has received the response.

In one embodiment, the client wakes and checks for a response at the same time that the original $F_{31}$ 404B frequency reoccurs in the frequency hopping sequence 400, but at the next frequency in the frequency hopping sequence. For example, again assume that the message 402 was sent to the host at frequency $F_{31}$ 404A. The client sleeps until $F_{31}$ 404B arises on the next occurrence of $F_{31}$ 404B in the frequency hopping sequence. At that time, the client monitors for a response, but monitors the next frequency in the frequency hopping sequence, which in the present example is $F_7$ 412. If no response is received, the client sleeps until $F_{31}$ 404B arises on the next occurrence of $F_{31}$ 404C in the frequency hopping sequence, yet monitors for the response on frequency $F_{17}$ 414, and so forth. This is just one representative alternative to other embodiments for monitoring for response messages from a targeted device(s).

As noted above, embodiments of the invention may also involve the use of multiple frequency hopping sequences. For example, wireless communication between devices may be communicated using radio frequency (RF) transmissions, where the transmission of messages, responses or other information can be sent at any of a plurality of available transmission frequencies using frequency hopping. In one embodiment, a common set of frequencies is used by both the initiating and target devices, but the target device(s) operates using a frequency hopping sequence for receiving signals that is different than the frequency hopping sequence used by the initiating device(s) for transmitting signals. The initiating device transmits information at the next available frequency of its frequency hopping sequence, but does not transmit that information until that same frequency arises in the receiver's frequency hopping sequence. In such an embodiment the initiating device sequence determines which frequency to use in transmitting the information, and the target device sequence determines when that transmission will occur. An example of a frequency hopping system utilizing multiple frequency hopping sequences in this manner is described in co-pending U.S. patent application Ser. No. 12/253,613, filed on Oct. 17, 2008, and entitled "System, Apparatus And Method For Communicating Messages Using Multiple Frequency Hopping Sequences," the content of which is incorporated herein by reference in its entirety.

Such an embodiment can be described in connection with the example of FIG. 4. The initiating device can transmit its message 402 using the next frequency (relative to the last frequency in which a message was transmitted) of its local frequency hopping sequence. Such a local frequency hopping sequence can be created using a seed known to the initiating device. A second frequency hopping sequence is used by the target device to determine which frequency will be monitored at a given time. In one embodiment, the target device's frequency hopping sequence and the local frequency hopping sequence at the initiating device utilize the same set of frequencies, but are arranged in a different order. The initiating device also uses the target device's frequency hopping sequence, whereby it will send its message 402 at the next frequency in its local frequency hopping sequence at the time that same frequency is being monitored in the target device. Once the message 402 is sent from the initiating device to the target device, acknowledgement signals and response signals are handled at the selected frequency $F_S$ as described above.

The functions associated with the present invention may be performed by discrete circuitry and/or computing system hardware. In one embodiment, the devices that will communicate with one another utilize a processor(s), CPU(s), computer(s), or other processing system to perform the stated functions. Accordingly, hardware, firmware, software or any combination thereof may be used to perform the various functions and operations described herein.

Figure 5:
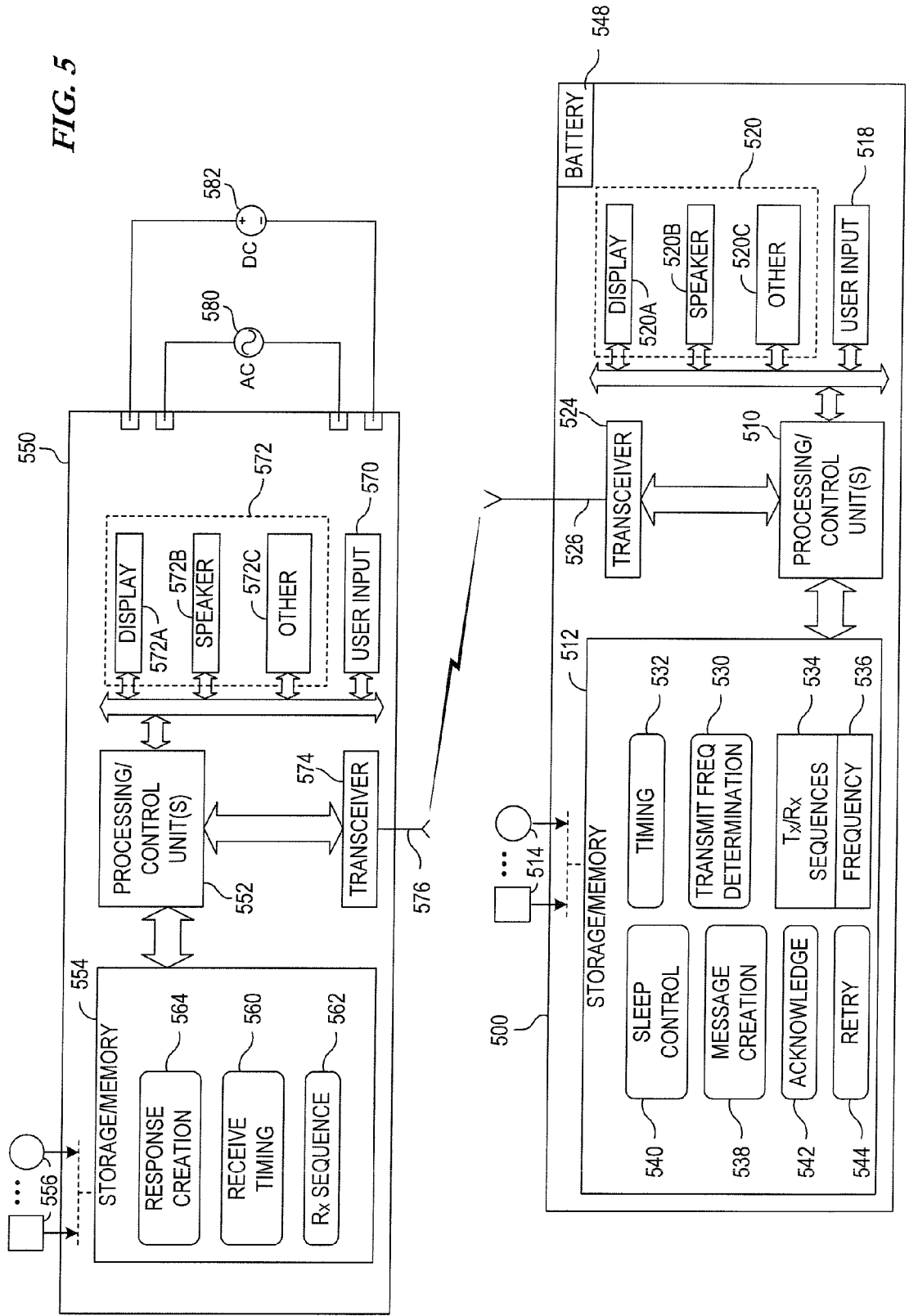
FIG. 5 illustrates representative processing arrangements for a communicating pair of devices.

Representative processing arrangements for a communicating pair of devices 500, 550 is illustrated in FIG. 5. The device 500 represents any transmitting device capable of performing the transmitting functions previously described, such as sending a query message to another device 550. A device may be both a transmitting and receiving device, and a device referred to herein as a transmitting or receiving device is based on whether it is operating as a transmitter or receiver for purposes of that description. In the illustrated embodiment, the device 500 represents a transmitting client device that is capable of communicating over the air, such as by RF communications. By way of example and not of limitation, the device 500 may represent communication portions of a thermostat, sensor, remote control, damper, humidifier, dehumidifier, etc.

The representative device 500 implements computing/processing systems to control and manage the conventional device activity as well as the device functionality provided by the present invention. For example, the representative device 500 includes a processing/control unit 510, such as a microprocessor, controller, reduced instruction set computer (RISC), central processing module, etc. The processing unit 510 need not be a single device, and may include one or more processors. For example, the processing unit may include a master processor and one or more associated slave processors coupled to communicate with the master processor.

The processing unit 510 controls the basic functions of the device 500 as dictated by programs available in the program storage/memory 512. The storage/memory 512 may include an operating system and/or various program and data modules associated with the present invention. In one embodiment of the invention, the programs are stored in non-volatile storage/memory so that the programs are not lost upon power down of the device. The storage 512 may also represent one or more of other types of read-only memory (ROM) and programmable and/or erasable ROM, random access memory (RAM), subscriber interface module (SIM), wireless interface module (WIM), smart card, or other fixed or removable memory device/media. The storage 512 may also include removable media 514 (e.g. disk, CD-ROM, DVD, etc.) that can be read via the appropriate interfaces and/or by appropriate media drives. The relevant software for carrying out device operations may be provided to the device 500 via any such storage media, or may be transmitted to the device 500 via data signals such as by way of a network.

For performing other device functions, the processor 510 may be coupled to user input interface 518 associated with the device 500. The user input interface 518 may include, for example, a keypad, function buttons, joystick, scrolling mechanism (e.g., mouse, trackball), touch pad/screen, and/or other user entry mechanisms. A user interface (UI) 520 may be provided, which allows the user of the device 500 to perceive information visually, audibly, through touch, etc. For example, a display 520A and/or speaker 520B may be associated with the device 500. Other user interface (UI) mechanisms 520C can also or alternatively be provided.

The processor 510 is also coupled to a transceiver 524, which represents either a transceiver or discrete transmitter and receiver components. The transceiver 524 is configured to communicate RF signals using frequency hopping as described herein. The transceiver 524 is coupled to an antenna 526.

In one embodiment, the storage/memory 512 stores the various client programs and data used in connection with the present invention. For example, a transmit frequency determination module 530 can be provided for a transmitting device to identify the frequency at which it will next transmit a message. A transmit timing module 532 may determine when the next transmission frequency becomes active in the receiver's frequency hopping sequence, and/or perform other timing functions such as those associated with the timing module 114 of FIG. 1. One or more frequency hopping sequences 534 as described herein may be stored in the storage 512, as may other data such as the frequency 536 at which a message was sent so that the same frequency can be monitored for incoming acknowledgement signals, responses, etc. In some embodiments the stored frequency(s) 536 may also store the last frequency used by the device 500 to transmit a message, so that the next frequency in the frequency hopping sequence may be used to send a subsequent message. In other embodiments one or more seeds for the sequences 534 may be stored in the storage 512, where the appropriate frequency hopping sequence(s) is calculated using the seed(s) when needed.

The storage may also store program modules to enable the device 500 to perform other functions in accordance with the invention. For example, the storage/memory 512 may include a message creation module 538 that formulates a query or other message for transmission to a target device 550. A sleep control module 540 controls functional units and/or other components of the device 500 in order to at least conserve power consumption. For example, the sleep control module 540 may be configured to turn off the transceiver 524 or the transmitting or receiving portions thereof. The sleep control module 540 can be configured to reduce or temporarily suspend any other desired functional operation and/or component of the device 500 to conserve local resources.

Still other modules may include an acknowledge module 542, which can recognize acknowledgement signals from another device 550, and/or create acknowledgement signals to return to another device 550 to notify it that a response or other message has been received. For example, the acknowledge module 542 can recognize receipt of an acknowledgement signal from another device by, for example, parsing a received message and determining from header information and/or the message body that it is an acknowledgement signal for the transmitted message. In another particular embodiment, the acknowledge module 542 can formulate the header information and message body to create an acknowledgement message to be transmitted to the responding device 550 to notify the device 550 that the device 500 received the response.

A retry module 544 can manage the retransmission of a message that was not acknowledged as received by a target device 550. For example, the retry module 544 can be informed by the acknowledge module 542 of non-receipt of an anticipated acknowledgement message, and in response, the retry module 544 may retrieve or reformulate the original message. The retry module 544 can cause the transceiver 524 to retransmit the message to the target device 550.

These and other modules may be separate modules operable with the processor 510, may be a single module performing each of these functions, or may include a plurality of such modules performing the various functions. While the modules are shown as multiple software/firmware modules, they may or may not reside in the same software/firmware program. It should also be recognized that one or more of these functions may be performed using discrete hardware. These modules are representative of the types of functional modules that may be associated with a device in accordance with the invention, and are not intended to represent an exhaustive list. Also, other described functions not specifically shown may be implemented by the processor 510.

FIG. 5 also depicts a representative receiving device 550 that is the targeted device of a message sent from the device 500. In one embodiment, the target device 550 represents the communication portions of a host device, such as thermostats, equipment interfaces, zoning panels, etc. The illustrated device 550 includes circuitry analogous to that of device 500, and similarly includes a processor 552 and storage/memory 554. In accordance with one embodiment, the storage/memory 554 and/or media devices 556 store the various programs and data used in connection with the invention. For example, the storage 554 may include a receive timing module 560 that is configured to determine when a frequency in its receiver frequency hopping sequence is active; i.e. what frequency is being listened to, and when. Stated alternatively, the receive timing module 560 identifies an active frequency in the frequency hopping sequence (shared with the device 500) in which to monitor for incoming messages. The storage 554 can store at least a receiver frequency hopping sequence 562, although it may also store a transmitter frequency hopping sequence (not shown) if it is also a transmitting device. The device 550 may also include other modules, such as a response creation module 564 that formulates a response message to respond to a query or other message from an initiating device 500.

The device 550 may also include other components or modules for performing other device functions, such as a user input interface 570. The user input interface 570 may include, for example, a keypad, function buttons, joystick, scrolling mechanism (e.g., mouse, trackball), touch pad/screen, and/or other user entry mechanisms. Other components may include a user interface (UI) 572, which allows the user of the device 550 to perceive information visually, audibly, through touch, etc. For example, a display 572A and/or speaker 572B may be associated with the device 550. Other user interface (UI) mechanisms 572C can also or alternatively be provided. The illustrated processor 552 is also coupled to a transceiver 574 (which may represent discrete transmitter and/or receiver components) configured to transmit and receive RF signals using frequency hopping as described herein. The transceiver 574 is coupled to an antenna 576.

In one embodiment, the device 550 also uses the Rx sequence 562 as its transmit ($T_X$) sequence. The timing of these transmissions could be at some derivative relative to "n" cycles of the $R_X$ total time sequence. This routine combined with synchronization information may provide a method which information (data) can be shared from device 550 to one or more device types 500, inclusive of the synchronization message itself. Any manner of synchronizing the devices for timing purposes can be used. For example, synchronization may be determined in a manner described herein and/or as described in co-pending U.S. patent application Ser. No. 12/564,682, filed on Sep. 22, 2009, and entitled "System, Apparatus and Method For Synchronizing Communications Between Devices," the content of which is incorporated herein by reference in its entirety. However, any manner of synchronizing the devices for timing purposes can be used.

The devices 500, 550 may be powered in any desired fashion. In one embodiment, the device 500 is battery 548 powered, and the sleep control module 540 controls components such as the transceiver 524 in order to conserve power and increase the useable life of the battery 548. The device 550 is not battery powered in the illustrated embodiment, but rather is powered by an external source such as an AC power source 580 or DC power source 582.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 6:
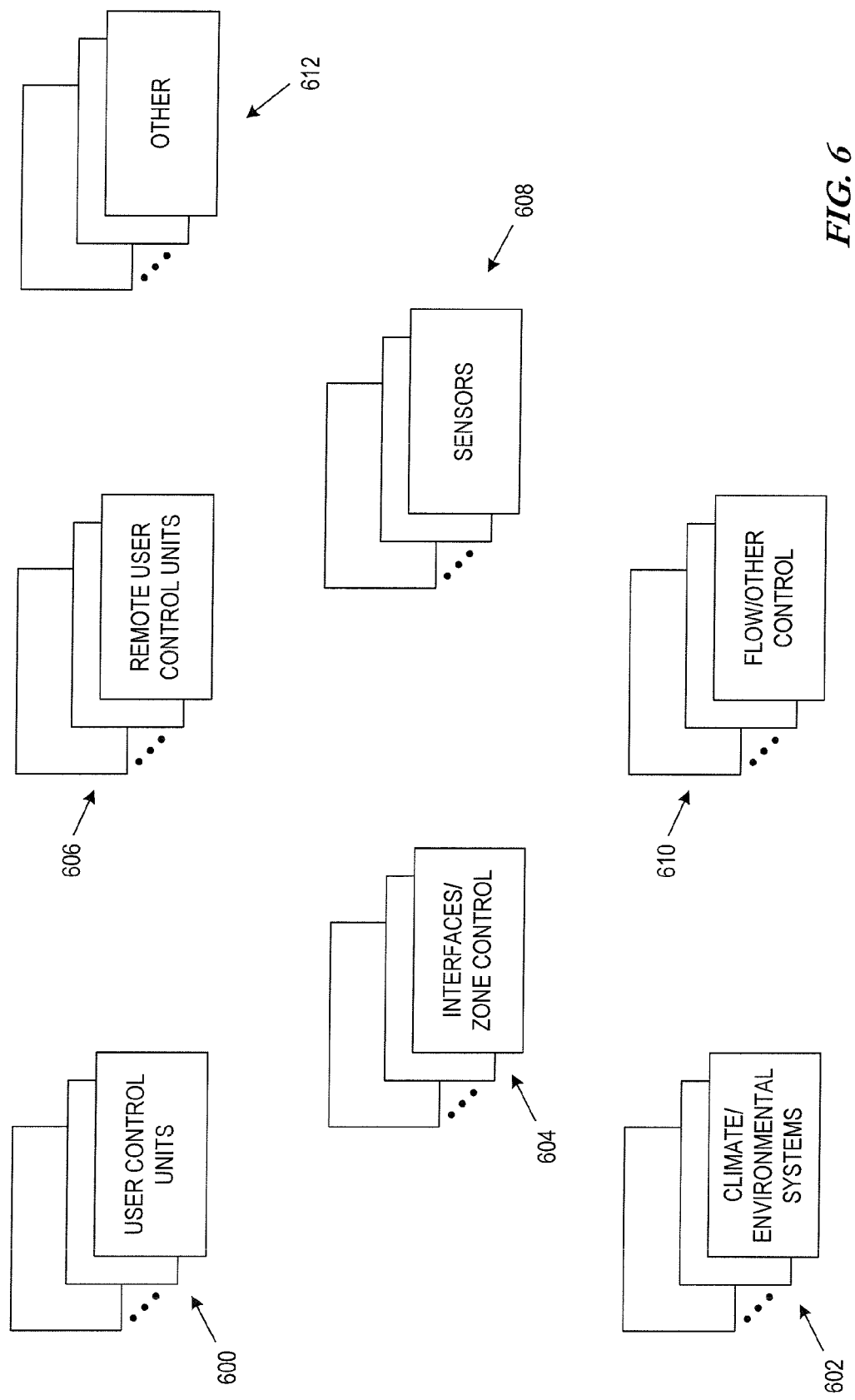
FIG. 6 is a block diagram generally illustrating representative HVAC elements and devices in which principles of the present invention may be applied.

FIG. 6 is a block diagram generally illustrating representative HVAC elements and devices in which air interfaces may be used. FIG. 6 depicts one or more user control units 600, such as wireless thermostats where users can enter a temperature setpoint designating a desired temperature. Other examples of user control units 600 include humidity control units, lighting control units, security control units, etc. Climate or environmental systems 602 may include the equipment to cause the desired action to occur. One such system 602 is an HVAC system, which includes equipment to raise or lower temperature, humidity, etc. User control units 600 may communicate directly with such climate/environmental systems 602, and/or may communicate via one or more interfaces or zone controllers 604. Remote user control units 606 provide portable user control, such as providing a visual and/or audio interface to the user, and allowing the user to change environmental setpoints, check status, etc. Sensors 608 may be used to sense environmental conditions, and may be discrete devices (e.g. outdoor air/temperature sensor) or may be integrated into user control units 600. Flow and other control equipment 610 may also be used, such as dampers, ultraviolet air treatment lamps, etc. Any of these devices may need to communicate information amongst themselves and/or with other devices 612, in which the present invention may be utilized.

When these devices communicate wirelessly with one another via radio frequency (RF) or other wireless means, there is a reasonable chance that a wirelessly communicating device may experience interference from neighboring systems or other devices of the same system. Using frequency hopping can significantly reduce such interference. Communicating via frequency hopping sequences as described herein enables, among other things, multiple devices to communicate in an orderly fashion while addressing interference issues.

Some devices in the system may be powered by power sources and communicate via wire and/or over the air, while other devices may be battery-powered and communicate information wirelessly. In one embodiment, devices that are powered by power sources, such as 24 volts AC (VAC), may be referred to herein as hosts, and may remain powered on while operating in the system. Other devices that are powered by battery may be referred to herein as clients, and may enter a sleep mode to preserve battery life. A collection of devices including a host(s) and its clients may be referred to as a group, and a collection of physical groups that communicate through their host(s) may be referred to as a system. However, a system as otherwise used herein does not require any such groupings, and may involve as few as two communicating devices.

Figure 7A:
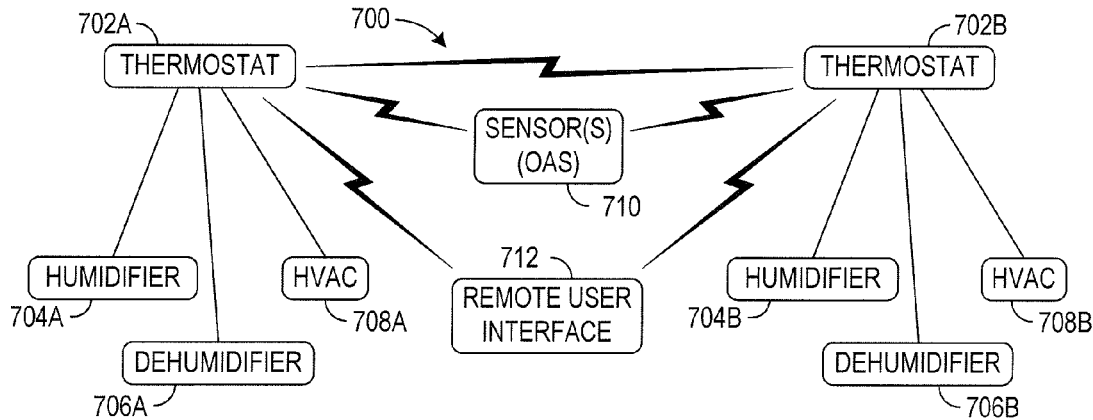
FIGS. 7A-7C depict some representative examples of clients, hosts, groups and systems that may benefit from principles of the invention.
Figure 7B:
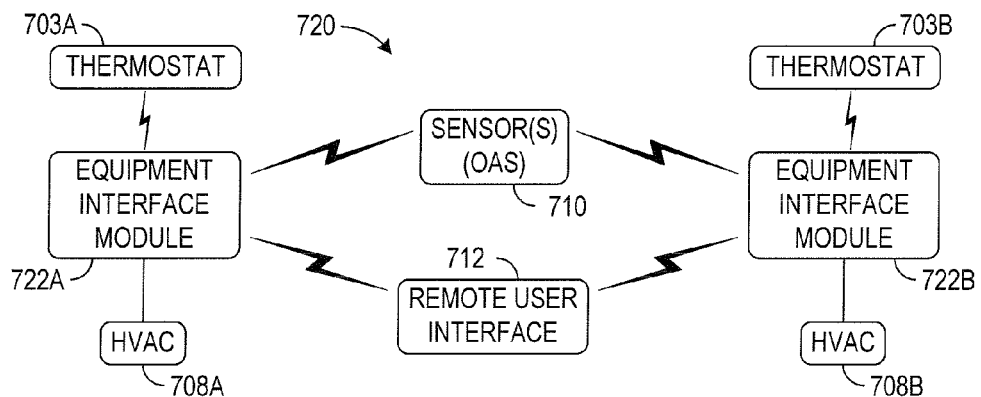
Figure 7C:
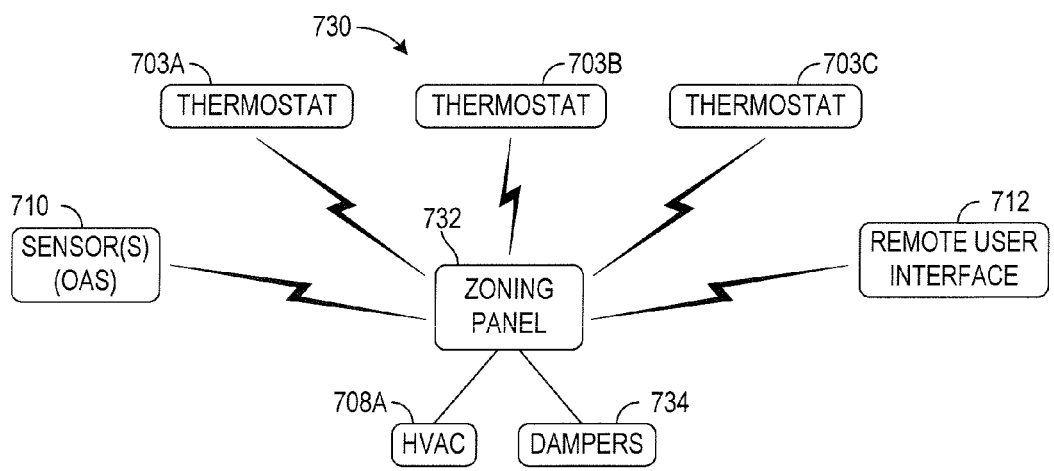

FIGS. 7A-7C depict some representative examples of clients, hosts, groups and systems that may benefit from principles of the invention. Like reference numbers are used for analogous devices where appropriate in FIGS. 7A-7C. Each of the devices depicted in FIGS. 7A-7C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 7A illustrates one system 700 where one or more thermostats 702A, 702B are configured as hosts, and may be powered by an AC power source, DC source or other power source. Each thermostat 702A, 702B may be wired to other equipment such as humidifiers 704A, 704B, dehumidifiers 706A, 706B, and HVAC equipment 708A, 708B respectively. Battery powered clients in the embodiment of FIG. 7A include one or more sensors 710, such as an outdoor air sensor (OAS), and one or more remote user interfaces (RUI) 712 which provide users with remote access and control of environmental conditions in the system 700. In accordance with one embodiment of the invention, clients such as the RUI 712 can serve as transmitters that transmit messages to other devices such as the host thermostat 702A that is configured to respond to such messages.

FIG. 7B illustrates another exemplary system 720 where one or more thermostats 703A, 703B are configured as clients, and may be powered by batteries. Each thermostat 703A, 703B respectively communicates wirelessly with an equipment interface module (EIM) 722A, 722B that may be AC-powered and wired to respective HVAC equipment 708A, 708B. In this embodiment, each EIM 722A, 722B operates as a host and communicates with various clients. For example, host EIM 722A can communicate wirelessly with clients including the thermostat 703A, the sensor(s) 710, and the RUI(s) 712. Similarly host EIM 722B can communicate wirelessly with clients including the thermostat 703B, the sensor(s) 710, and the RUI(s) 712. In accordance with the invention, clients such as the thermostat 703A can transmit messages requesting a response(s) from other devices, such as the host EIM 722A that is configured to respond to such messages.

FIG. 7C illustrates another system 730 which utilizes area zoning using a zoning panel 732. In this embodiment, the zoning panel 732 serves as a host that may be AC-powered. The zoning panel 732 of FIG. 7C is connected to other equipment such as the HVAC 708A and dampers 734. Clients include the thermostats 703A, 703B, 703C, sensor(s) 710, RUI 712, and possibly dampers 734 when such dampers are wirelessly controlled. In accordance with the invention, clients such as any of the thermostats 703A/B/C can transmit messages to other devices, such as the host zoning panel 732 that is configured to respond to such messages.

It should be noted that the exemplary environments described in FIGS. 6 and 7A-7C are provided merely for purposes of facilitating an understanding of representative systems in which the principles of the present invention may be employed. From the description provided herein, one skilled in the art can readily appreciate that the invention may be employed in any system of two or more communicating devices.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
transmitting a message via a frequency of a frequency hopping sequence;
determining when the same frequency will reoccur in the frequency hopping sequence;
entering a sleep mode;
emerging from the sleep mode when the frequency at which the message was transmitted reoccurs in the frequency hopping sequence; and
monitoring for a response to the message via the frequency at which the message was transmitted when the frequency reoccurs in the frequency hopping sequence.

2. The method of claim 1, further comprising:
recognizing that the response was not received during a monitored frequency's time slot duration;
determining when the same frequency will again reoccur in the frequency hopping sequence;
reentering the sleep mode;
emerging from the sleep mode when the frequency at which the original message was transmitted reoccurs in the frequency hopping sequence; and
monitoring for the response to the message via the frequency.

3. The method of claim 2, wherein the functions of recognizing that the response was not received, determining when the same frequency will again reoccur, reentering and emerging from the sleep mode, and monitoring for the response are repeated until the response is received.

4. The method of claim 2, wherein the functions of recognizing that the response was not received, determining when the same frequency will again reoccur, reentering and emerging from the sleep mode, and monitoring for the response are repeated a predetermined number of times.

5. The method of claim 1, further comprising:
recognizing that the response was not received during a monitored frequency's time slot duration;
determining when the same frequency will again reoccur in the frequency hopping sequence;
reentering the sleep mode;
emerging from the sleep mode when the frequency at which the message was transmitted reoccurs in the frequency hopping sequence; and
monitoring for the response via the frequency immediately following the frequency in the frequency hopping sequence at which the message was transmitted, at the time the frequency of the message transmission reoccurs in the frequency hopping sequence.

6. The method of claim 1, wherein:
transmitting the message comprises transmitting the message via the frequency of the frequency hopping sequence when the frequency arises in a shared frequency hopping sequence;
determining when the same frequency will reoccur comprises determining when the same frequency will reoccur in the shared frequency hopping sequence;
emerging from the sleep mode comprises emerging from the sleep mode when the frequency at which the message was transmitted reoccurs in the shared frequency hopping sequence; and
monitoring for the response comprises monitoring for the response to the message via the frequency at which the message was transmitted when the frequency reoccurs in the shared frequency hopping sequence.

7. The method of claim 6, further comprising:
recognizing that the response was not received during a monitored frequency's time slot duration;
determining when a next successive frequency in the local frequency hopping sequence will occur in the shared frequency hopping sequence;
reentering the sleep mode;
emerging from the sleep mode when said next successive frequency reoccurs in the frequency hopping sequence; and
monitoring for the response to the message via said next successive frequency.

8. The method of claim 1, further comprising monitoring for an acknowledgement from a target device indicative of receipt of the message by the target device, wherein the monitoring comprises monitoring for the acknowledgement at the same frequency of the message transmission following transmission of the message.

9. The method of claim 8, wherein monitoring for the acknowledgement at the same frequency comprises turning on a receiver to monitor the frequency in response to transmitting the message at that frequency.

10. The method of claim 8, wherein the monitoring for the acknowledgement further comprises determining that the acknowledgement was not received, and further comprising retransmitting the message via a successive frequency of the frequency hopping sequence.

11. The method of claim 1, wherein entering the sleep mode comprises reducing power consumption in a device that transmitted the message by deactivating one or more functional components in the device.

12. The method of claim 11, wherein:
deactivating one or more functional components comprises at least deactivating a receiver in the device to postpone monitoring for the response until the device emerges from the sleep mode; and
emerging from the sleep mode comprises at least activating the receiver in the device to monitor for the response.

13. The method of claim 1, wherein determining when the same frequency will reoccur in the frequency hopping sequence comprises calculating a time duration, based on at least a quantity of frequencies in the frequency hopping sequence, an order of the frequencies in the frequency hopping sequence, and a time slot duration in which each of the frequencies is active, until the same frequency arises.

14. An apparatus comprising:
a receiver;
a transmitter configured to transmit a message via a frequency;
a timer module configured to determine when the frequency will occur in a frequency hopping sequence;
a sleep control module configured to cause at least the receiver to enter a sleep mode, and to cause the receiver to emerge from the sleep mode when the timer module indicates that the frequency has occurred in the frequency hopping sequence; and
wherein the receiver is configured to monitor for a response to the message via the frequency at which the message was transmitted when the receiver has emerged from the sleep mode.

15. The apparatus as in claim 14, wherein the timer module is further configured to determine a duration for which the frequency will be active in the frequency hopping sequence, and if no response to the message was received during the duration, to notify the sleep control module to cause at least the receiver to reenter the sleep mode until the timer module again indicates that the frequency has reoccurred in the frequency hopping sequence.

16. The apparatus as in claim 15, wherein the receiver is further configured to monitor for the response to the message via a frequency subsequent to the frequency in the frequency hopping sequence at which the message was transmitted, at the time the frequency at which the message was transmitted occurs in the frequency hopping sequence.

17. The apparatus as in claim 14, further comprising an acknowledge module configured to recognize acknowledgement signals received from a target device via the receiver in response to successful transmission of the message to the target device.

18. The apparatus as in claim 17, further comprising a retry module coupled to the acknowledge module to receive an indication of non-receipt of the acknowledgement signals, and configured to effect a retransmission of the message via the frequency used to originally send the message.

19. The apparatus as in claim 17, further comprising a retry module coupled to the acknowledge module to receive an indication of non-receipt of the acknowledgement signals, and configured to effect a retransmission of the message via a second frequency following the frequency in a transmitter frequency hopping sequence.

20. The apparatus as in claim 14, further comprising an acknowledge module configured to formulate an acknowledgement message for transmission to a target device that provided the response to the message.

21. A system comprising:
at least one target device comprising a receive timing module configured to identify an active frequency in a shared frequency hopping sequence in which to monitor for incoming messages;
at least one initiating device comprising:
  a receiver;
  a transmitter configured to transmit a response-evoking message to the at least one target device via a frequency;
  a timer module configured to determine when the frequency will occur in the shared frequency hopping sequence;
  a sleep control module configured to cause at least the receiver to enter a sleep mode, and to cause the receiver to emerge from the sleep mode when the timer module indicates that the frequency has occurred in the shared frequency hopping sequence; and
wherein the receiver is configured to monitor for a response to the response-evoking message from the at least one target device via the frequency when the receiver has emerged from the sleep mode.

22. The system of claim 21, wherein the at least one target device further comprises a response creation module configured to formulate the response in response to receiving the response-evoking message from the at least one initiating device.

* * * * *